(12) United States Patent
Williams et al.

(10) Patent No.: US 11,700,684 B2
(45) Date of Patent: Jul. 11, 2023

(54) LIGHT SOURCE FOR HIGH POWER COHERENT LIGHT, IMAGING SYSTEM, AND METHOD OF USING RELATIVISTIC ELECTRONS FOR IMAGING AND TREATMENT

(71) Applicant: Triseka, Inc., Park City, UT (US)

(72) Inventors: Gwyn P. Williams, Yorktown, VA (US); George R. Neil, Williamsburg, VA (US)

(73) Assignee: Triseka, Inc., Park City, UT (US)

( * ) Notice: Subject to any disclaimer, the term of this patent is extended or adjusted under 35 U.S.C. 154(b) by 0 days.

(21) Appl. No.: 17/858,868

(22) Filed: Jul. 6, 2022

(65) Prior Publication Data

US 2023/0008065 A1     Jan. 12, 2023

Related U.S. Application Data

(60) Provisional application No. 63/219,165, filed on Jul. 7, 2021.

(51) Int. Cl.
*H05H 7/04* (2006.01)
*H01S 3/09* (2006.01)

(52) U.S. Cl.
CPC ............. *H05H 7/04* (2013.01); *H01S 3/0903* (2013.01); *H05H 2007/041* (2013.01)

(58) Field of Classification Search
CPC ... H05H 7/04; H05H 2007/041; H01S 3/0903
See application file for complete search history.

(56) References Cited

U.S. PATENT DOCUMENTS

| | | | |
|---|---|---|---|
| 6,714,346 B1 * | 3/2004 | Neil ...................... | H01S 3/0903 359/346 |
| 6,844,688 B1 * | 1/2005 | Williams .................. | H01S 1/02 315/505 |
| 7,253,426 B2 * | 8/2007 | Gorrell .................... | H01J 25/00 250/493.1 |
| 7,473,914 B2 | 1/2009 | Todd et al. | |
| 7,557,365 B2 * | 7/2009 | Gorrell .................... | H01J 25/34 250/493.1 |
| 7,626,179 B2 * | 12/2009 | Gorrell ..................... | H01S 3/09 250/493.1 |

(Continued)

OTHER PUBLICATIONS

G. L. Carr, et al., Very high Power THz radiation Sources, THz BRIDGE Conference, Capi, Italy Sep. 29-Oct. 2, 2002, pp. 13.

(Continued)

*Primary Examiner* — David A Vanore
(74) *Attorney, Agent, or Firm* — Banner & Witcoff, Ltd.

(57) ABSTRACT

A light source for high power coherent light can include multiparticle relativistic bunches of electrons generating high intensity propagating fields. Coherent emission between electrons may also be utilized. The source may be independent of any medium or media to remove all constraints on the wavelength of the light emitted. And at least a portion of a single alternating magnetic field for accelerating the electron bunches can be included. The color or wavelength of the produced light can be determined solely by the parameters of the electron bunches and the alternating field. The source can be used for imaging, such as medical imaging or for security, including concealed weapons, and for quality control.

20 Claims, 7 Drawing Sheets

(56) References Cited

U.S. PATENT DOCUMENTS

| | | | | |
|---|---|---|---|---|
| 7,859,199 | B1* | 12/2010 | Benson | H05H 7/04 |
| | | | | 315/505 |
| 8,362,430 | B1* | 1/2013 | Williams | G01N 21/3581 |
| | | | | 250/341.1 |
| 9,209,587 | B2 | 12/2015 | Biallas et al. | |
| 10,212,800 | B2* | 2/2019 | Agustsson | G21K 1/046 |
| 10,304,651 | B2* | 5/2019 | Fallahi | H01J 29/481 |
| 10,505,334 | B2* | 12/2019 | Yang | H01J 23/06 |
| 2004/0240035 | A1* | 12/2004 | Zhilkov | H01S 3/0903 |
| | | | | 359/293 |
| 2006/0062258 | A1* | 3/2006 | Brau | H01S 3/0903 |
| | | | | 372/2 |
| 2009/0146085 | A1* | 6/2009 | Smirnov | H01J 25/02 |
| | | | | 250/504 R |
| 2010/0072405 | A1* | 3/2010 | Yu | H01J 25/02 |
| | | | | 250/493.1 |
| 2011/0304283 | A1* | 12/2011 | Sprangle | H01J 23/06 |
| | | | | 315/500 |
| 2015/0145404 | A1* | 5/2015 | Almasi | H05H 9/00 |
| | | | | 313/359.1 |
| 2015/0280386 | A1* | 10/2015 | Biallas | G21K 1/10 |
| | | | | 372/2 |
| 2016/0020574 | A1* | 1/2016 | Almási | H01S 3/0959 |
| | | | | 372/2 |
| 2016/0307659 | A1* | 10/2016 | Nanni | H05G 2/00 |
| 2016/0323985 | A1* | 11/2016 | Kaertner | H05G 2/00 |
| 2017/0263410 | A1* | 9/2017 | Fallahi | H05H 15/00 |
| 2023/0008065 | A1* | 1/2023 | Williams | H01S 3/0903 |

OTHER PUBLICATIONS

Chien Aun Chan, et al., Terahertz calculations for the Australian synchrotron, SPIE, Belingham, WA, 2004, Proc. of SPIE vol. 5277, 404-414.

J. Michael Klopf, et al., Terahertz imaging using the Jefferson Lab—FEL high power broadband terahertz source, University of Delaware, Newark, DE 19716 USA, pp. 20.

G.L. Carr, et al., High-power terahertz radiation from relativistic electrons, NATURE |vol. 420 | 14 Nov. 2002 www.nature.com/nature ©2002 Nature PublishingGroup, pp. 153-156.

G.L. Carr, et al., Very high Power THz radiation from Relativistic Electrons, 0-7803-7423-11021$17.00 02002 IEEE, pp. 101-102.

Gwyn P. Williams, Filling the THz Gap, Jefferson Lab, CASA Seminar, Nov. 14, 2003, pp. 1-47.

S. Benson, et al., High Power THz Generation from Sub-ps Bunches of Retaivistic Electrons, p. 9.

George R. Neil, et al., High power terahertz production from relativistic electron beams, Terahertz Science and Technology, ISSN 1941-7411 vol. 8, No. 2, Jun. 2015, pp. 41-49.

George R. Neil, et al., Evolution of the high power THz source program at Jefferson lab, INFPHY 592 No. of pp. 3, DTD = 4.3.1, Feb. 20, 2004 Disk used, 1350-4495/$—see front matter 2004 Published by Elsevier B.V.. doi:10.1016/j.infrared.2004.01.006, pp. 3.

G.L. Carr, et al., Very High Power THz Radiation Sources, Journal of Biological Physics 29: 319-325, 2003 © 2003 Kluwer Academic Publishers. Printed in the Netherlands., pp. 319-325.

M.S. Sherwin, et al., Opportunities in THz Science, DOE-NSF-NIH Workshop on Opportunities in THz Science Feb. 12-14, 2004, Arlington, VA, pp. 1-124.

G.R. Neil, et al., The JLab high power ERL light source, Nuclear Instruments and Methods in Physics Research A 557 [2006] 9-15, Jefferson Lab, 12000 Jefferson Avenue, Newport News, VA 23606, USA Available online Nov. 15, 2005, pp9-15.

G.P. Williams, FAR-IR/THz Radiation from the Jefferson Lab FEL Energy Recovered LINAC, Prepared for sri-2001 Madison Wisconsin Aug. 21-24, 2001, Proceedings to be published in Review of Scientific Instruments, p. 12.

GWYN p. WILLAMS, Filling the THz gap - high power sources and applications, Rep. Prog. Phys. 69 (2006) 301-326 Jo:10.1088/0034-4885/69/2/R01, p. 27.

G.L. Carr, et al., High-power terahertz radiation from relativistic electrons, Article in Nature Dec. 2002 DOI 10.1038/nature01175 - Source: PubMed, at: https://www.researchgate.net/publication/11035740, p. 5.

S S. Dhillon et al., The 2017 terahertz science and technology roadmap, Journal of Physics D: Applied Physics, J. Phys. D: Appl. Phys. 50 (2017) 043001 (49pp), downloaded Apr. 1, 2017.

* cited by examiner

LIGHT SOURCE FOR HIGH POWER COHERENT LIGHT, IMAGING SYSTEM, AND METHOD OF USING RELATIVISTIC ELECTRONS FOR IMAGING AND TREATMENT

CROSS REFERENCE TO RELATED APPLICATION

The application claims the benefit of U.S. Provisional Application No. 63/219,165, filed Jul. 7, 2021, which is incorporated herein by reference in its entirety.

FIELD

The disclosure relates generally to a light source for producing very high-power coherent terahertz light and a real-time terahertz imaging system.

BACKGROUND

This disclosure pertains to a high-power terahertz light source for real-time imaging. The terahertz light is non-ionizing and is highly temporally and spatially coherent, allowing considerable flexibility in application.

BRIEF SUMMARY

The following presents a simplified summary of the disclosure in order to provide a basic understanding of some aspects of the disclosure. This summary is not an extensive overview of the disclosure. It is not intended to identify key or critical elements of the invention or to delineate the scope of the invention. The following summary merely presents some concepts of the disclosure in a simplified form as a prelude to the more detailed description provided below.

In one example, this disclosure provides a compact light source where very high-power spatially and temporally coherent terahertz light can be produced by combining Maxwell's equations with relativity theory and with further extensions to multiparticle coherence and stimulated emission. The frequency and bandwidth of the light source are controlled by the parameters of the generator.

The light source can be used in various types of real-time imaging both in reflection and transmission. In one example, the improved light source can be used for imaging underground or concealed land mines, including those made of plastic. In yet another example the improved light source can be used for unbiased cancer screening and diagnostics and for cancer margin identification, including during surgery. In yet another example the improved light source can be used for infectious disease detection. In yet another example the improved light source can be used for security screening to detect weapons, harmful articles or contraband underneath clothing. In yet another example the light source can be used for screening parcels, letters, or containers. In yet another example, the light source can be used for quality control purposes in manufacturing pills or inspecting foods during production.

It is also contemplated that the improved light source can be used for communication purposes. It is also contemplated that the improved light source can be used to manipulate biological tissue.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

In one example, a light source can utilize a manifestation of solutions to Maxwell's equations that describe propagating fields from accelerated electric charges, when the charges or electrons are traveling relativistically. Relativistic electrons have much higher mass than non-relativistic electrons and in some examples their mass is at least several times their rest mass. Also relativistic electrons have reduced lengths, and their time-clocks slow down. This results in propagating fields that are orders of magnitude higher than electrons that are not traveling so fast. In one example, relativistic electrons may travel at greater than 99.9% of the speed of light. The formula for determining the power in the propagating field is $$\text{Power} = \frac{2e^2 a^2}{3c^3} \gamma^4$$

where $\gamma$ is the ratio of the electron mass to its rest mass, e is the charge of an electron, a is the acceleration it undergoes, and c is the speed of light. This equation is known as the relativistic form of Larmor's equation.

Maxwell's equations describe mathematically the relationship between electric and magnetic fields generated by electric charges in motion. Charges at rest produce an electric field, charges traveling at constant velocity produce a magnetic field, but this application focuses on accelerating or oscillating charges which produce propagating fields called electromagnetic waves. These have many different applications, such as imaging and communication as discussed herein. The present disclosure, using relativistic charged particles, differs from production of electromagnetic waves which are generated by non-relativistic charges in antennae such as those used in wireless transmission protocols, such as 5G, 4G, 3G, LTE, Wi-Fi, Bluetooth, BLE, NFC, infrared, etc.

Maxwell's equations can be combined with equations that explain how the physics changes when objects travel at speeds approaching that of light, also known as relativity theory. When combined, the propagating fields from an oscillating relativistic electron increase by the fourth power of the mass increase that is a consequence of relativity. Thus, very high-power coherent terahertz light can be produced by taking advantage of the solutions of the merger of Maxwell's equations with relativity theory. For example, an electron that is accelerated to an energy of 10 million volts, the mass increases by a factor of around 20, and the enhancement is a factor of 160,000.

In addition to the exploitation of Maxwell's equations combined with relativity described above, this disclosure includes multiple charged particles that radiate together in phase. For a bunch of n electrons that are separated in space by less than half a wavelength of the light that they are emitting, the intensity of the light field is the $n^2$ that from an individual electron. So in an electron bunch holding 10 million electrons, for one electron the gain in propagated intensity is 100,000,000,000,000.

The power of the propagating electromagnetic field from an oscillating relativistic electron or the emission from multiple electrons may also be accurately predicted. For each oscillation sequence of the electron bunch, the energy radiated is approximately 1% of the bunch energy. Thus, a 100 million electron volt beam at 1 milliamp average current, will have an energy of 100,000 watts and will radiate approximately 1,000 watts.

It may be also be possible to organize the electron bunches so that their lateral spatial extent (perpendicular to their direction of travel) is comparable to the wavelength of the light being emitted. This can result in a high degree of spatial coherence across the propagating wave, and these special properties may afford opportunities and advantages for imaging when compared to incoherent sources of light, allowing electro-optic detection for example when combined with their temporal coherence.

Figure 1:
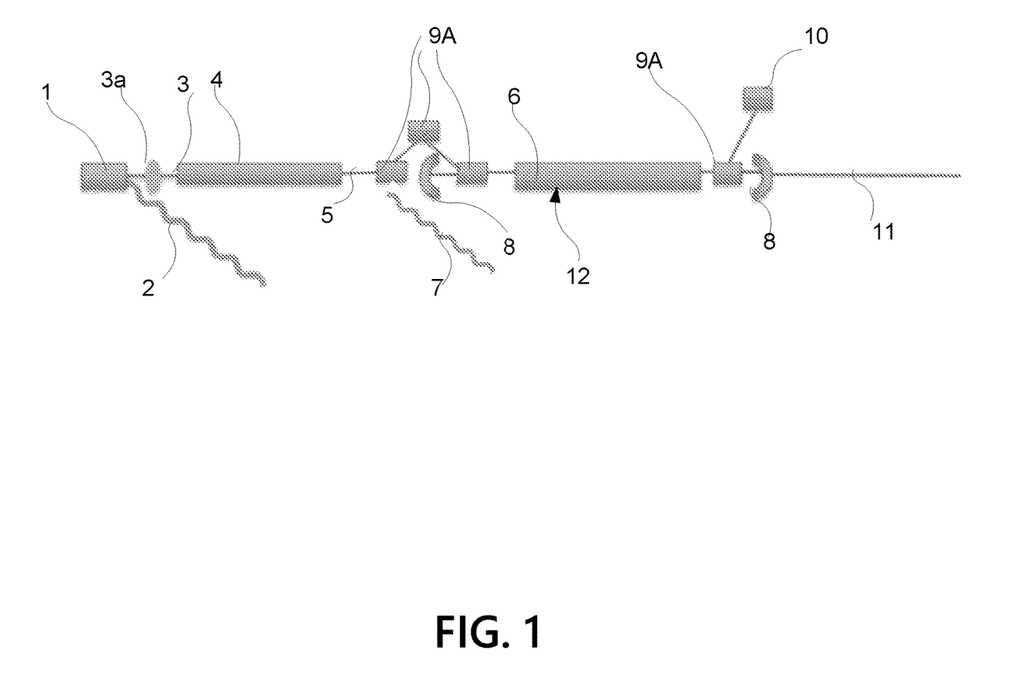
FIG. 1 schematically illustrates an example of a source for high power coherent light using relativistic electron bunches.

FIG. 1 shows a schematic of a light source, which in one example can be a terahertz generator, that can apply the above, i.e. the combination of Maxwell's equations and equations pertaining to relativity. As shown in FIG. 1, multiparticle relativistic bunches of electrons are generated by a compact accelerator system 1. The compact accelerator system 1 can be configured to produce multiparticle relativistic bunches of electrons to generate high intensity propagating fields of emitted light. In one example, the compact accelerator system 1 can be independent of any medium or media to remove all constraints on the wavelength of the emitted light. The compact accelerator can be less than 30 feet long by 10 feet wide, but is not confined to these parameters. And in another examples, the compact accelerator can be 5 meters or less in length.

An example of a compact accelerator system 1 is an electron bunch generator gun, which may include a cathode. In one example, the electrons can be generated by thermal emission. As such, the electron bunch generator gun cathode can be thermionic. And in another example the compact accelerator system can in addition include a sub picosecond external laser 2, which can generate the electrons by photoelectric emission. And the compact accelerator system can be photoelectric. In other examples, the compact accelerator system can generate electrons by field emission.

The electron bunches are then accelerated away from the cathode of the gun 1 either by a fixed DC anode or by using a radio-frequency cavity, and transported by a vacuum transport system 3 to a linear accelerator 4. The vacuum transport system 3 can be a series of sealed pipes or sealed tubes. In this example, the vacuum transport system 3 may also include an optional electron bunching device 3a for further bunching the electrons. In certain examples, the electron bunching device 3a can be a radio-frequency cavity, or a dispersive magnetic system followed by a physical structure. In another example a dielectric waveguide may be used to self-induce energy modulation which can lead to ballistic bunching. In one example, the linear accelerator can operate at frequencies corresponding to S-band or L-band, and the linear accelerator can be pulsed.

The bunches of electrons 5 are then transported through a magnetic field 6, which may or may not lie within an optical cavity 12 formed by a pair of mirrors 8, which can be highly reflecting in the THz range. In one example, the magnetic field 6 can comprise a series of alternating magnetic fields, which causes the electrons to be deflected first up, then down in a wavy, wiggling motion, oscillating up and down.

In one example of the optical cavity 12, one mirror can be partially transmitting to allow a portion of the optical beam to escape. For instance, in one example, some of the beam is reflected and some of the beam is transmitted through the mirror(s). This may be accomplished by providing one or more holes in one or both of the mirrors 8 allowing the radiation 11 (e.g. THz, propagating THz field) to go through the one or more holes in the mirrors to a subsequent mirror or mirrors for use. In another example one mirror may be partially transmitting across its entire surface. Further it can be necessary to divert the electron beam to avoid hitting the mirrors 8 so as to avoid damaging the mirrors. To divert the electron beam to avoid the mirrors 8, diverters in the form of additional dipole magnets 9A can be used. And in one example a series of dipole magnets 9A can be used and may be placed on either or both sides of the optical cavity 12.

Also, alternatively or optionally some of the propagating light generated can be reflected back within the optical cavity 12, and further reflected to propagate along the electron beam path. Interactions between the propagating light and the electron beam further micro-bunch the latter and enhance the terahertz emission. In this example, in which the electron beam is steered around the cavity mirrors 8 using the additional dipole magnets 9A, such dipole magnets may additionally be used to compress the electron bunches longitudinally to enhance the higher frequency components of the terahertz emission to accomplish terahertz emission in the range above 1 THz to 10 THz or beyond.

In one example, the propagating fields from the bunches of electrons are stimulated using an outside propagating field from an external source such an optional external laser 7. The external laser 7 can be included to propagate alongside the bunches of electrons inside the cavity along the electron beam path to enhance the bunching to arrive at the desired output. This laser can be a high peak power laser which modulates the electron energy to cause the bunching to be enhanced. The alternating magnetic field 6 generates high intensity propagating fields. In one example, the magnetic field can be static by alternating from N-S-N-S, etc. In another example the magnetic field can be helical. The electron beam continues past the alternating magnetic field and is deflected by a magnet 9 into a dump 10. The magnet 9 can be a dipole magnet, a permanent magnet, a superconducting magnet or an electromagnet.

The electron dump 10 is used for receiving spent electrons. In one example, the dump can be formed of a water-cooled copper plate. In the electron dump 10 the bunches of electrons strike a cooled metal plate where their kinetic energy is converted to thermal energy, or heat. Additionally, in certain examples, a cooling system can be applied, which can include a heat sink and may include various fans and fins in order to remove heat from the system.

The electron beam transport system is in vacuum, which removes all physical constraints on the wavelength and power of the light emitted. In one example, the vacuum can be accomplished by tightly sealing the system and using vacuum pumps to purge any residual leakage or gas emission inside the pipes. Instead, the parameters of the emitted electromagnetic wave depend only on the nature of the electron bunches, specifically their energy and emittance, and on the spatial distribution and magnitude of the magnetic fields.

The electron beam transport system may also manipulate an electron bunch length by electric and/or magnetic fields and/or by use of a dielectric wave guide.

Figure 2:
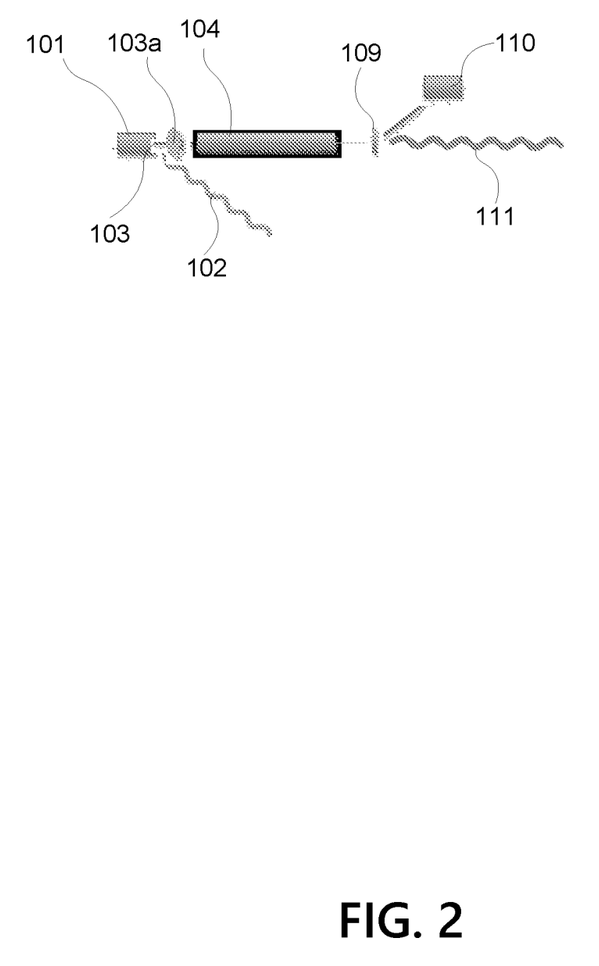
FIG. 2 schematically illustrates another example of a source for high power coherent light using relativistic electron bunches.

FIG. 2 shows another example terahertz light source, where like reference numerals represent similar components that have similar functionality as the example discussed in relation to FIG. 1. Yet in this example, the mirrors, the alternating magnetic field, and the external laser may be omitted for simplicity and cost. In this example, terahertz light or a terahertz field is generated by the magnet 109. Also the magnet 109 can be configured to deflect spent electrons to the dump 110, which like in the above example may be a metal plate.

As such in this example high power terahertz emission is accomplished with a single magnetic field or part of a single magnetic field created by magnet 9. This is referred to as spontaneous emission where mirrors, alternating magnetic fields, and external lasers are omitted or not utilized. In this example, the terahertz spectrum generated is of wide bandwidth in this example. In this example, the bandwidth can be from 0.3 to 1 THz. The bandwidth can extend from the cutoff frequency of the vacuum pipe at the long wavelength end to the cutoff due to the electron bunch length on the short wavelength end. Wavelengths longer than roughly twice the pipe diameter will not propagate down the tube. On the short end of the spectrum significant power is not produced at wavelengths shorter than twice the electron pulse length.

Figure 3:
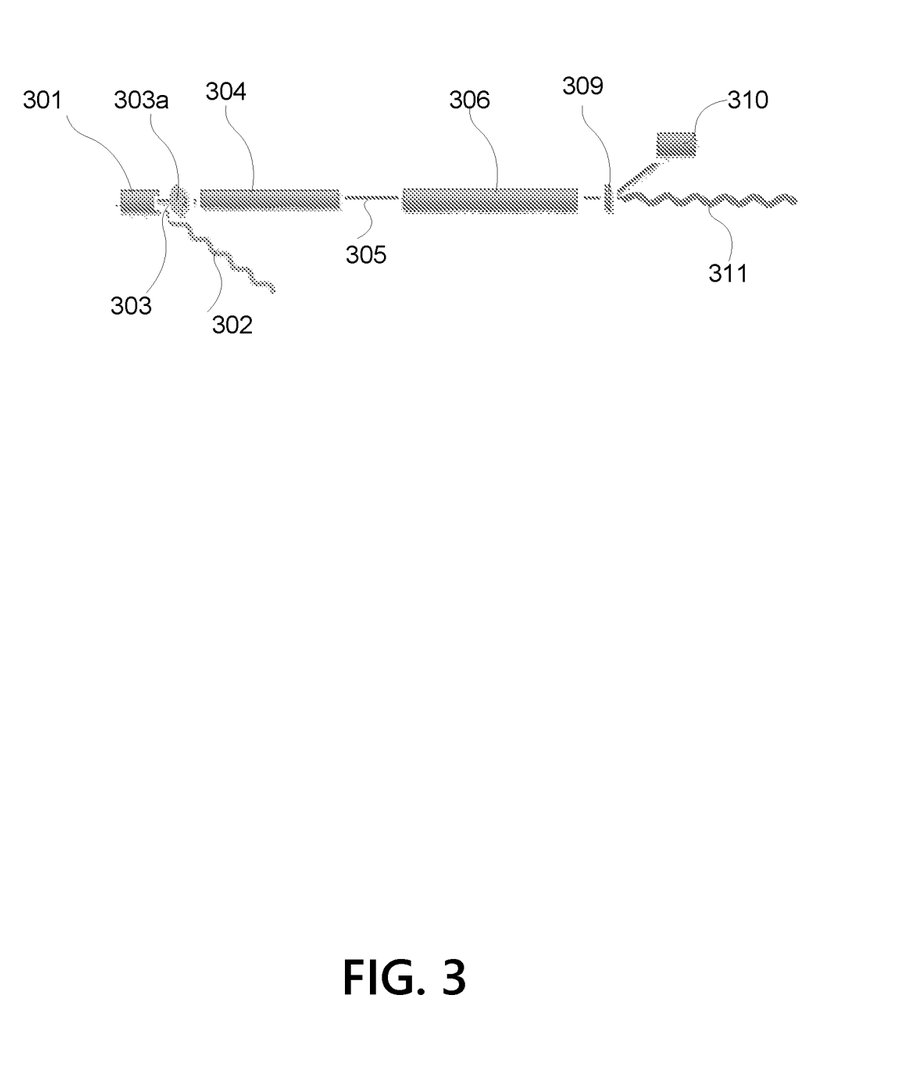
FIG. 3 schematically illustrates another example of a source for high power coherent light using relativistic electron bunches.

In yet another example of high power terahertz emission, shown in relation to FIG. 3, where like reference numerals represent similar components that have similar functionality as the example discussed in relation to FIGS. 1 and 2, the propagating fields from the bunches of electrons can be spontaneously induced by a series of magnets 306 of alternating fields in a device called an undulator. This is also spontaneous emission, but enhanced by a longer magnetic field path, and particularly by phase-coherent coherent field enhancement from oscillation to oscillation. In this example, an external laser and the optical cavity and mirrors are not utilized. Also in this example, a dipole magnet 9 is utilized solely for redirection of the electron beam. The terahertz spectrum generated by this method is of a narrower bandwidth, for example in the range of 0.9 to 1.1 THz, and specific frequencies may be selected to be enhanced.

In the example of high power terahertz emission shown in relation to FIG. 3, the emission can be induced by a series of alternating fields in undulator 306, but can be further enhanced by interactions between the propagating electromagnetic field with the electron beam itself. This is called self-amplified spontaneous emission—the propagating fields from the bunches of electrons are stimulated using a propagating field from an electron bunch itself to create self-amplified spontaneous emission.

This may be accomplished by having sufficient bunch charge and sufficient interaction distance (temporal and physical overlap of the electron bunch and THz field) that amplification of the THz field can occur.

Figure 4:
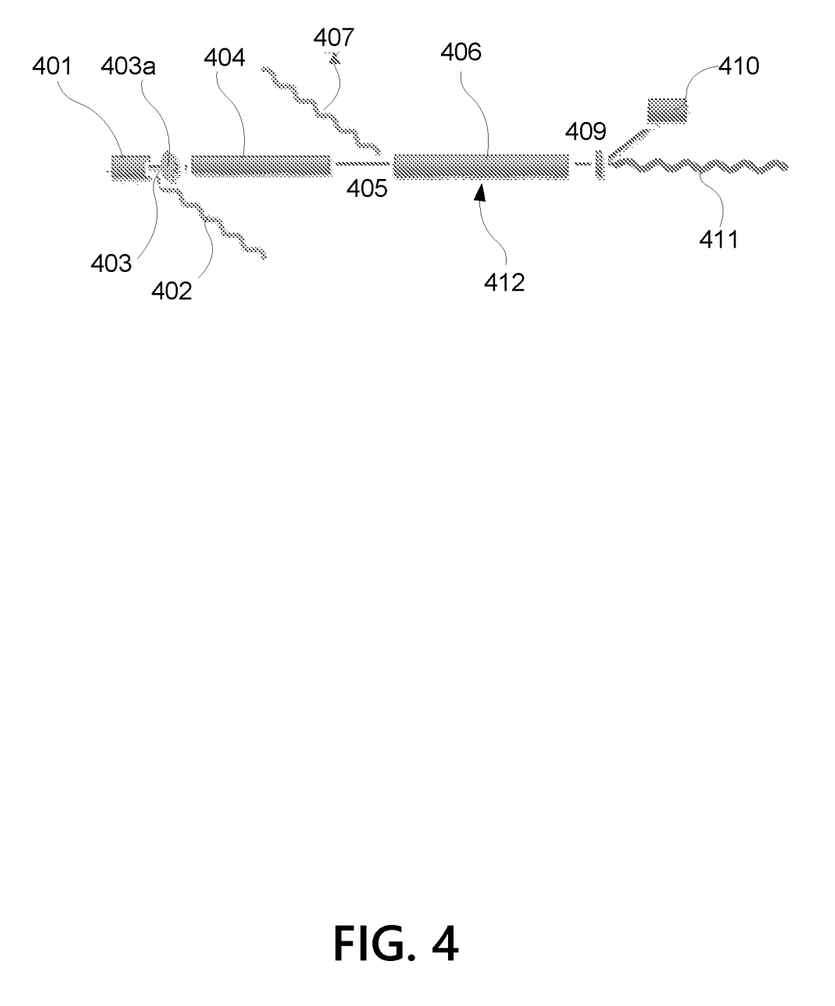
FIG. 4 schematically illustrates another example of a source for high power coherent light using relativistic electron bunches.

In yet another example of high power terahertz emission, which is depicted schematically in FIG. 4, where like reference numerals indicate similar components with similar functionality, an external laser source 407 may propagate along the electron beam path causing the electron beam to further bunch, enhancing the coherence and increasing the propagating field. In this example, the external laser source can be a pulsed high peak power laser. In this case, the optical mirrors are not utilized.

For the example light sources described in the above examples, the color, energy, or wavelength and bandwidth of the emitted light is determined solely by the parameters of the electron beam and the alternating magnetic field. For example, to obtain a broadband spectral emission up to 1 THz an electron bunch length of 500 fs traversing magnets 9, 109, 309, 409 may be required. And in one example, the electron bunch length is less than 500 fs full width half-maximum and the electron bunches can be 10-1000 pico-Coulombs in charge.

Also since the THz output is determined by the electron beam and the alternating field parameters, the frequency, power, and bandwidth of the THz radiation can be adjusted in real time by changing the electron beam energy, current, charge, or pulse width or a combination of those. The THz radiation may also be adjusted by adjusting the alternating magnetic field parameters. Feedback on the electron parameters from the THz produced can be used to adjust, optimize, control, or stabilize the THz output. In addition to this the electron beam can be controlled and continually optimized through the use of electron beam diagnostics along the accelerator. Such diagnostics monitor and control in real time the electron beam charge, current, trajectory, bunch length, and energy. Additionally, measurements of the THz radiation can be used to control or modify the electron beam parameters by feedback for the purpose of adjusting or stabilizing the THz power, frequency, bandwidth or direction of propagation.

In one example, an artificial intelligence (AI) model may be trained and stored in memory of the system to assist an AI component to use a feedback loop to adjust and refine its settings and operation. The AI component may include one or more processors for processing machine learning and deep learning calculations with efficiency and speed. Also a neural network can be provided for providing valuable feedback as the system is trained with radiation outputs such as the electron beam diagnostics in order to adjust the parameters of the alternating field parameters, the frequency, power, and bandwidth of the THz radiation. It is also contemplated that a networked, crowdsourced arrangement could be provided where the system obtains additional data from other systems in order to teach the system to refine settings and operation. Such sharing of information may allow the training of the AI component with a higher speed and efficiency.

To obtain emission at a specific frequency, the magnetic field period can be the wavelength multiplied by 2 times gamma squared. Therefore, to make 1 THz from an undulator using a 5 MeV electron beam (whose relativistic factor, gamma, is approximately 10, the magnetic period needs to be approximately 6 cm. The bandwidth will be approximately the inverse number of periods. Also the above examples may provide a high power (1-100 Watts) terahertz light source comprising wavelengths of 3 mm to 30 micrometers for real-time imaging.

In one example, the brightness of the light source is very high, being determined, as in a laser, approximately by the power divided by the wavelength squared due to the high degree of spatial coherence.

The high-power terahertz light sources are industrially robust and may have a multiplicity of components including the guns, 1, 101, 301, 401, laser 2, 102, 301, 401, the magnetic transport systems, 3, 103, 303, 403, 5, 105, 305, 405 the linear accelerator 4, 104, 304, 404 the alternating magnetic field 6, 106, 306, 406 and the electron beam dump 10, 110, 310, 410. This provides sufficient redundancy so as to have an operating up-time of close to 100%. This can be done by a implementing a magnetic or rapid electric field switching system that steers the electron bunches into the required components. Failed components can then be isolated and either repaired in-situ or removed and replaced.

Figure 5:
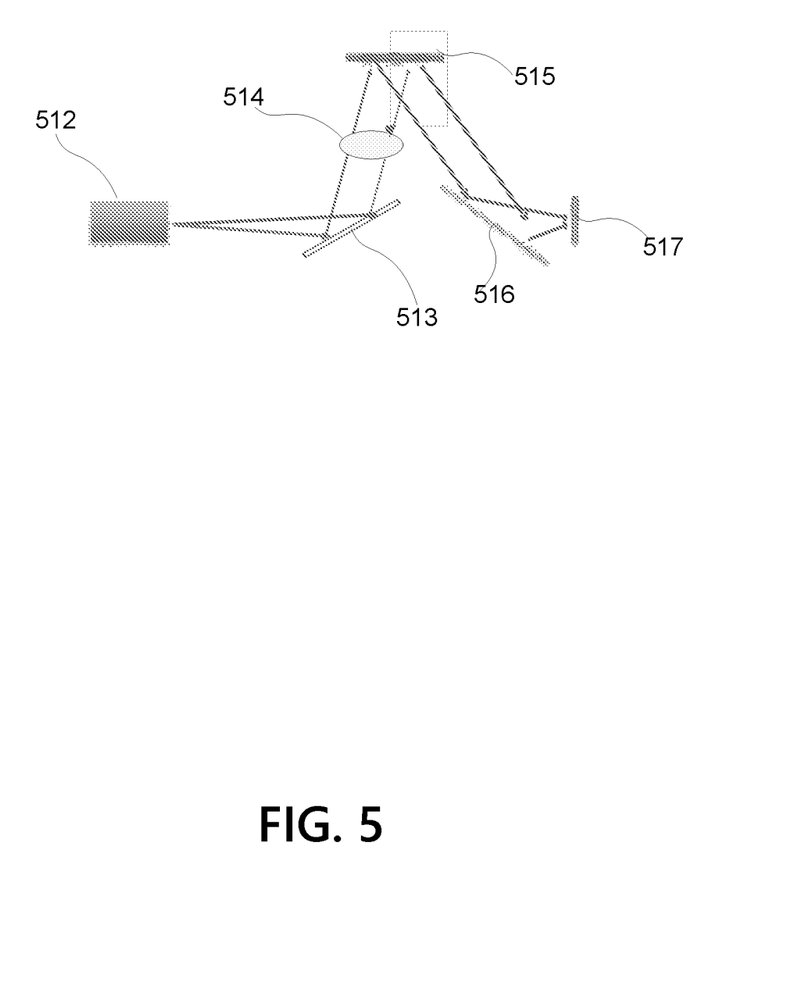
FIG. 5 schematically illustrates an example imaging system using electromagnetic waves from relativistic electron bunches using a high power coherent light source.

FIG. 5 shows a schematic of a real time terahertz imaging system or imager used to image an object, animal, or person 515. As shown schematically in FIG. 5, a propagating field from a high-power terahertz generator, which can be in the form of any of the above examples, is intercepted by the objective mirror 513 of the terahertz imaging system. The objective mirror 513 helps to tailor a propagating wavefront from the source 512 and causes an object 515 to be illuminated using one or a series of mirrors. At some point along the beam path a window 514 may be used to separate the accelerator vacuum from the optical vacuum. For example, the exit window 514 may be at the focus of the object mirror 513, the window could be placed between the object mirror 513 and the object 515 or anywhere along the beam path.

Reflected light from the object 515 is collected by mirror 516 and the wavefront modified to impinge on a detector 517. In this example, the detector 517 may be a single element, in which case the object may be scanned across the beam, the beam scanned across the object, or the detector scanned across the imaging plane, or may be a two-dimensional array (camera) to allow real-time imaging. In another example, the detector may comprise wavelength spectral analysis using filters, a spectrometer or an interferometer. In certain examples, the detector may be placed at any point in the beam path and intercept either the whole or partial beam.

Figure 6:
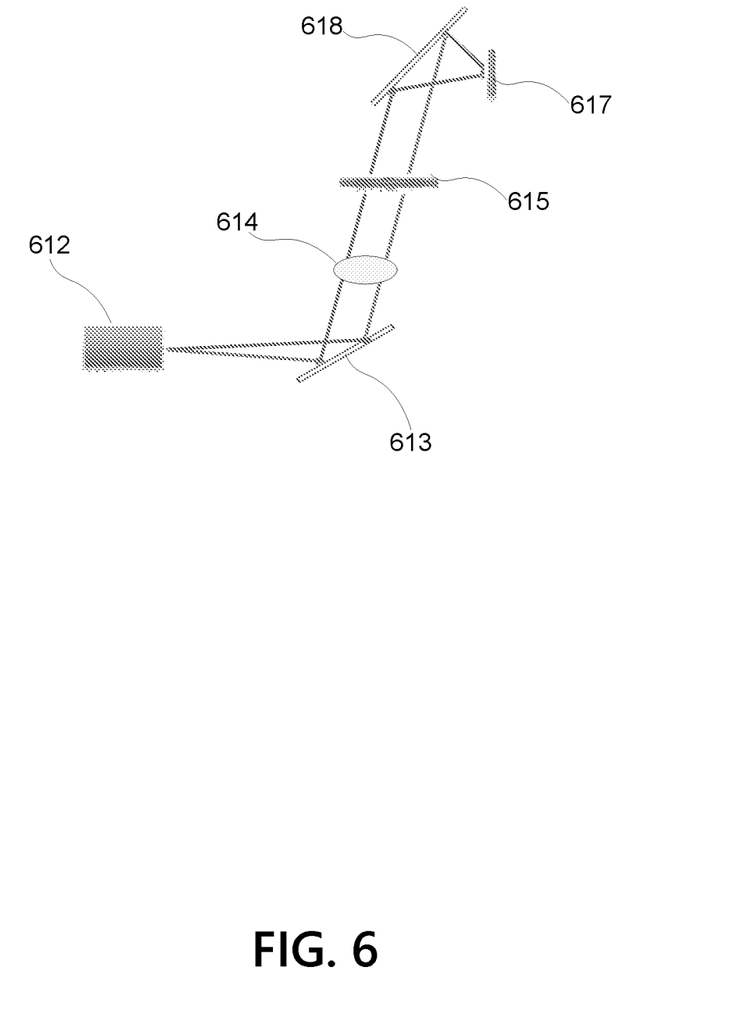
FIG. 6 schematically illustrates another example imaging system using electromagnetic waves from relativistic electron bunches using a high power coherent light source.

In another example shown in relation to FIG. 6, where similar reference numerals represent similar components with similar functionality. Yet in this example, the wavefront from the illuminated object 615, may be imaged in transmission. In this case the beam is propagated to mirror 618 and imaged using a mirror or series of mirrors, to an imaging plane 617. In this second alternative example of imaging, the object may be scanned across the beam, the beam scanned across the object, or the detector scanned across the imaging plane, or may be a two-dimensional array (camera) to allow real-time imaging. In another example, the detector may comprise wavelength spectral analysis using filters, a spectrometer or an interferometer. Again, in certain examples, the detector may be placed at any point in the beam path and intercept either the whole or partial beam. Again the exit window 614 may be at the focus of the object mirror 613, the window could be placed between the object mirror 613 and the object 615 or anywhere along the beam path.

It is also contemplated that in the above examples of the optical imaging systems, some or all of the optical beam path can be in vacuum to improve transmission.

It is also contemplated that in the above examples of the optical imaging systems, lenses are used in place of, or in conjunction with mirrors.

Additionally in relation to the above examples, the reflected beam from the object may lie at any angle with respect to the incident beam, including zero degrees, or fully back-scattered.

In the above examples, the radiation illuminating the object is broadband, that is, having a bandwidth of greater than 5%. And in this example, the source may produce radiation of greater than 5% bandwidth for the purpose of interrogating the reflection, absorption, or transmission of an object. For example, adjusting the parameters of the accelerators 4, 104, 304, 404 or alternating magnetic fields 6, 306, 406 or omitting the alternating magnetic fields altogether as in the example discussed in relation to FIG. 2 may provide a bandwidth of greater than 5%. In this way the detection system can be designed to provide simultaneous or near simultaneous information about the reflection, absorption, and transmission of the object at multiple wavelengths.

Yet in other alternative examples, the radiation may be less than 5% bandwidth and information about the reflection, absorption, and transmission of the object at multiple wavelengths can be obtained by scanning the output wavelength by adjusting the parameters of the accelerators 4, 104, 304, 404 or alternating magnetic fields 6, 306, 406. In this particular example, the source can produce radiation of less than 5% bandwidth, and the output wavelength is varied by less than or equal to 5% for the purpose of interrogating the reflection, absorption, or transmission of an object.

Also, in the above examples, some of the beam can be intercepted by one or more detectors to analyze the beam for diagnostic purposes. And the one or more detectors may comprise a detection system which is configured to measure a reflection, transmission, or absorption of an illuminated object as a function of wavelength.

Figure 7:
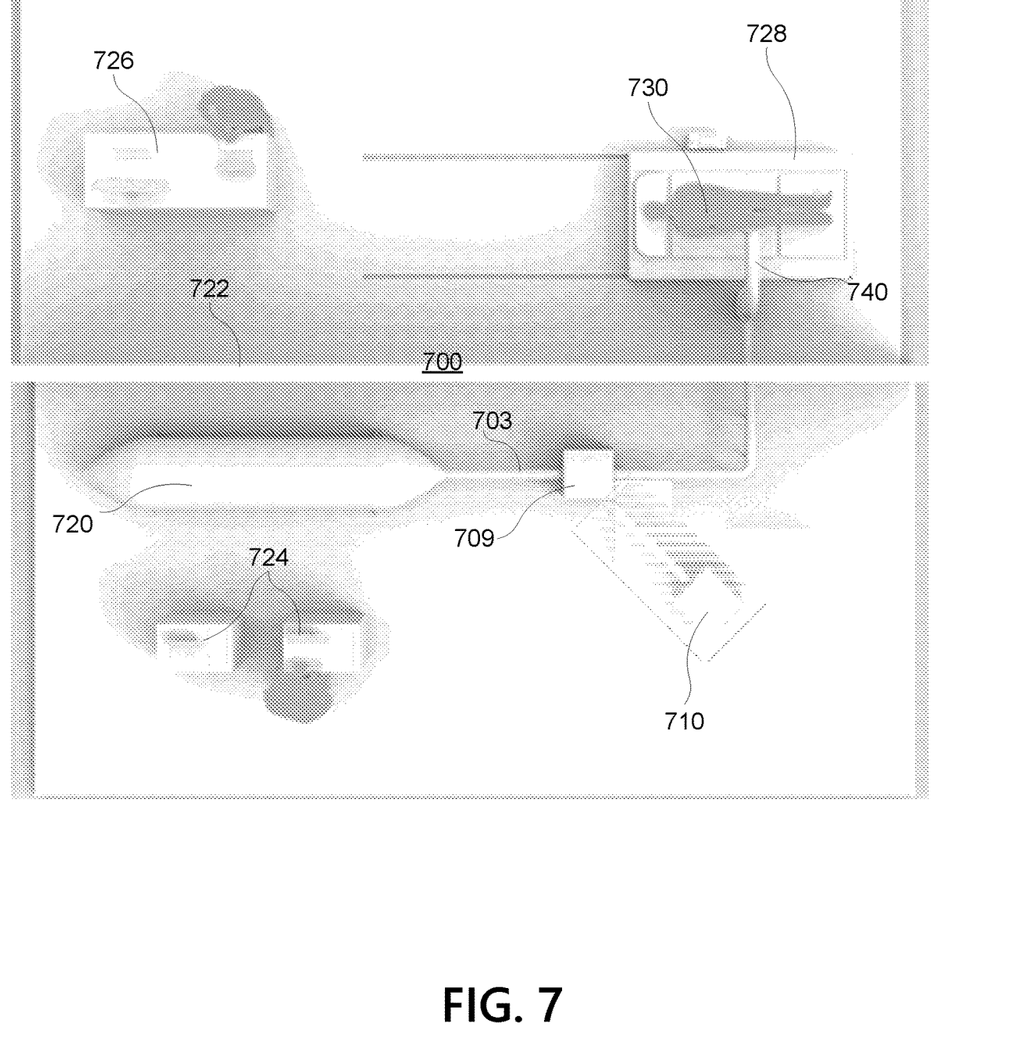
FIG. 7 shows an example imaging and/or treatment system in accordance with the present disclosure.

FIG. 7 shows a top view of an example imaging and/or treatment system 700. The imaging and/or treatment system 700 can incorporate any of the examples discussed herein alone or in combination. For example, the source housing 720 can include any one of the examples as discussed in relation to FIGS. 1-5, and the imager/treatment device 740 can include any one of the examples as discussed in relation to FIGS. 5 and 6. Also as shown in FIG. 7, a patient 730 can be imaged or treated using the imager/treatment device 740, while lying on gurney or bed 728 or alternatively the patient could be standing during the treatment or imaging process. Also, one or more controlling stations 724, 726 can be used to adjust various parameters of the source of the THz and the imager/treatment device 740.

As such and in accordance with the above the source housing 720 can house one or more of a gun, a linear accelerator, electron bunching device, optical cavity, mirrors, dipole magnets, external laser (which could be within another compartment of the source housing 720), and alternating magnetic field. Also in accordance with the above examples, a vacuum transport system 703 in the form of tubes can be provided for transporting the propagating THz field to the imager/treatment device 740 and the electron beams. Also in one example, a magnet or series of magnets 709 can be placed outside of the source housing 720 in order to deflect the electron beam to the external dump 710 and divert a propagating THz field to the imager/treatment device 740. Also in this example, the source housing 720, series of magnets 720, and external dump can be placed on one side of a diverter wall and the imager/treatment device 740 can be placed on the other side of the diverter wall. This is to reduce exposure of radiation by the patient and staff to levels that are minimal compared to daily terrestrial exposures. And in the above example, a patient would receive less than 10 millirem of radiation from the source, whereas most patients receive 300 millirem of radiation or more from medical x-rays and the like per year.

The above example imaging systems may utilize the above example compact high-power terahertz technology ("THz") combined with a molecular imager in which images are taken at molecular resonances. It is also contemplated that and automation can be utilized on both for control and analysis to enable an automated unbiased cancer screening and an aid in cancer diagnosis and surgery. The system may be capable of providing up to 100 watts of THz radiation, which in turn can provide non-ionizing, large-scale, real-time visualizations at the molecular level.

The above example systems may be able to detect the differences in the liquid content of cells so as to differentiate healthy cells from malignant cells, and in addition may be capable of being tuned to unique molecular resonant frequencies of malignant cells in order to identify them during cancer screening.

The qualities associated with THz radiation make it particularly suited for skin cancer diagnostics. The imaging devices discussed herein may be able to provide a view of changes taking place at the molecular level that are indicative of malignancies. For example, THz is absorbed by liquid water, which means it can easily identify water content in various substances. This may allow for the differentiation of cells containing different quantities of water—such as malignant cells from healthy cells. In addition, many substances emit at resonance within the THz region of the spectrum, and a THz source can be tuned to pick up the resonance of those substances. That allows for their easy identification. For example, if cancer cells emit a resonance of roughly 1.65 THz, this falls squarely within the region that a THz source can be tuned into.

It is also contemplated that the above systems can be particularly useful in producing real time scans or video imaging of a patient or object. Such a system can scan an entire patient or object in a manner of minutes, for example 1 to 5 minutes, where existing systems would take hours. Also the real time scans or videos produced can have a high degree of resolution, such as 1 mm or less resolution and down to 0.33 mm.

Again here it is contemplated that AI models can be trained and stored in memory on the imager to provide an AI component that utilizes a feedback loop to adjust and refine the imagers ability to detect cancer and to adjust the imager's settings and operation. The AI component may one or more processors or cloud computing for processing machine learning and deep learning calculations with high efficiency and speed. Additionally a neural network can be implemented to provide valuable feedback for training the imager with real cancer images.

Furthermore, the system can operate in a networked, crowdsourced environment connected to multiple imagers such that the multiple imagers provide cancer images. The multiple imagers can share information over a suitable wireless connection, such as the cloud. The sharing of information may allow the training of the AI component with greater efficiency. It is also contemplated that the real cancer images could be preloaded into the AI component aside from other THz based imaging systems in order to train the AI component with greater speed and efficiencies.

In another example, the THz radiation produced by the examples discussed herein can be utilized to modify the physical, biological, or chemical characteristics of the object. To do this the THz radiation is tuned to the wavelength of interest and focused such that the power density is sufficient to thermally de-nature the object. It is contemplated that this can be at the cellular level such that the denaturization alters a protein shape or composition through the external stress of THz radiation in such a way that it will no longer be able to carry out its cellular function. It is further contemplated that THz radiation causes dissociation of methyl-DNA bonds which in turn causes a decrease in the global degree of methylation, or demethylation of cancer cells.

Again here it is contemplated that AI models can be trained and stored in memory on the imager/treatment device to provide an AI component that utilizes a feedback loop to adjust and refine the settings and operation of the system as a treatment device in the treatment of cancer. The AI component may one or more processors or cloud computing for processing machine learning and deep learning calculations with high efficiency and speed. Additionally a neural network can be implemented to provide valuable feedback for training the treatment with the appropriate parameters e.g. power levels, frequencies, duration, etc. for denaturization of cancer cells.

Furthermore, the system can operate in a networked, crowdsourced environment connected to multiple treatment devices such that the multiple treatment devices provide denaturization properties. The multiple treatment devices can share information over a suitable wireless connection, such as the cloud. The sharing of information may allow the training of the AI component with greater efficiency.

In one example a light source can include a compact accelerator system which can be configured to produce multiparticle relativistic bunches of electrons to generate high intensity propagating fields of emitted light. The compact accelerator can be independent of any medium or media to remove all constraints on the wavelength of the emitted light, and at least a portion of a single alternating magnetic field can be used for accelerating the electron bunches to produce light. A color or wavelength of the emitted light can be determined solely by parameters of the bunches of electrons and the alternating magnetic field.

The electrons can be traveling relativistically such that their mass is at least several times their rest mass. The light produced can be 1-100 watts and wavelength of the light produced is in the range from 3 mm to 30 micrometers. The propagating fields from the bunches of electrons can be spontaneously induced by a series of magnets of alternating fields. The propagating fields from the bunches of electrons can be stimulated using an outside propagating field from an external source.

The propagating fields from the bunches of electrons can be stimulated using a propagating field from an electron bunch itself to create a self-amplified spontaneous emission.

The propagating fields from the bunches of electrons may be stimulated using a propagating field circulated inside an optical cavity surrounding the magnets of alternating fields.

The light source may also include an imaging system and the propagating fields from the bunches of electrons can be intercepted by the imaging system to cause an object to be illuminated. The electron bunches can be produced by a laser at a gun cathode. The gun cathode can be thermionic. The electron bunch length may be less than 500 fs full width half-maximum. The electron bunches can be 10-1000 pico-Coulombs in charge.

The light source may also include a linear accelerator and the linear accelerator can operate at frequencies corresponding to S-band or L-band, and the linear accelerator can be pulsed. The light source may include a beam transport system and the beam transport system can manipulate an electron bunch length.

The electron bunch length can be manipulated by one or more of an electric field, magnetic field or by use of a dielectric wave guide. The light source can also include an optical system that is used to image an illuminated object to an imaging plane. The light source can also include a detection system configured to measure a reflection, transmission, or absorption of an illuminated object as a function of wavelength. The light can be utilized to modify the physical, biological, or chemical characteristics of the object. The light source may also have an operating up-time of close to 99%.

The light source may produce radiation of greater than 5% bandwidth for the purpose of interrogating the reflection, absorption, or transmission of an object and the light source can produce radiation of less than 5% bandwidth and the output wavelength can be varied by less than or equal to 5% for the purpose of interrogating the reflection, absorption, or transmission of an object.

The light source can produce radiation for the purpose of measuring the water content of an object. The measurements of the emitted light can be used to control or modify parameters of the electron bunches by feedback for adjusting or stabilizing the emitted light power, frequency, bandwidth or direction of propagation.

An apparatus can include a source yielding a THz field, the source may include an electron bunch generator gun having a cathode for generating relativistic bunches of electrons in the form of an electron beam; a vacuum transport system for transporting the relativistic bunches of electrons; a linear accelerator; a magnet configured for producing a THz field and deflecting spent electrons to a dump and wherein the dump is configured to receive the spent electrons.

The apparatus can also include an imaging system coupled to the source, the imaging system having an objective mirror intercepting the THz field and tailoring the THz field and wherein the objective mirror is configured to cause a body to be illuminated; and a detector configured to intercept reflected light from the body.

The source can include an electron bunching device for further bunching the electrons. The source can include a pair of cavity mirrors, and the source further comprises a diverter configured to prevent the electron beam from hitting the mirrors. The diverter can be one or more dipole magnets. The source can further include an external laser for enhancing bunching of the electrons. The source can further include an alternating magnetic field. The imaging system can further include a window.

A method of imaging a body can include providing a THz field with relativistic bunches of electrons in the form of an electron beam; for transporting the relativistic bunches of electrons in a vacuum transport system; accelerating the electron beam in a linear accelerator; applying a magnetic field to the electron beam to produce a THz field and utilizing the magnetic field to deflect spent electrons to a dump; intercepting the THz field with an objective mirror; illuminating the body with the objective minor; and intercepting the reflected light from the body.

The method can further include bunching the electrons with an electron bunching device; providing a pair of cavity minors; diverting the electron beam to prevent the electron beam from hitting the mirrors; diverting the electron beam with one or more dipole magnets; enhancing the bunching of electrons with an external laser; creating an alternating magnetic field and applying the alternating magnetic field to the electron beam; directing the THz field through a window.

An exemplary method can include producing multiparticle relativistic bunches of electrons to generate high intensity propagating fields of emitted light; removing any medium or media to remove all constraints on the wavelength of the emitted light; providing an alternating magnetic field for accelerating the electron bunches to produce light with one or more magnets; altering parameters of the electron bunches and the oscillating magnetic field to change one or more of a color or wavelength of the emitted light. The electrons can be traveling relativistically such that their mass is at least several times their rest mass. The light produced can be 1-100 watts and wavelength of the light produced can be in the range from 3 mm to 30 micrometers.

The method can further include spontaneously inducing the propagating fields from the bunches of electrons by a series of magnets providing alternating fields; simulating the propagating fields from the bunches of electrons with an outside propagating field from an external source; simulating the propagating fields from the bunches of electrons using a propagating field from an electron bunch itself to create a self-amplified spontaneous emission; simulating the propagating fields from the bunches of electrons using a propagating field circulated inside an optical cavity surrounding the series of magnets providing alternating fields; intercepting the propagating fields from the bunches of electrons with an imaging system to cause an object to be illuminated; producing the bunches of electrons with a laser at a gun cathode. The electron bunch length can be less than 500 fs full width half-maximum. The electron bunches can be 10-1000 pico-Coulombs in charge.

The method can further include accelerating the bunces of electrons with a linear accelerator and operating the linear accelerator at frequencies corresponding to S-band or L-band; pulsing the linear accelerator; providing a beam transport system and manipulating an electron bunch length with the beam transport system; manipulating the electron bunch length by one or more of an electric field, magnetic field or by use of a dielectric wave guide; configuring an optical system to image an illuminated object to an imaging plane; measuring a reflection, transmission, or absorption of an illuminated object as a function of wavelength with a detector; modifying the physical, biological, or chemical characteristics of the object with the light, and producing radiation for the purpose of measuring the water content of an object.

The light source can produce radiation of greater than 5% bandwidth for the purpose of interrogating the reflection, absorption, or transmission of an object. And the light source produces radiation of less than 5% bandwidth and the output wavelength can be varied by less than or equal to 5% for the purpose of interrogating the reflection, absorption, or transmission of an object.

It is contemplated that the above-described examples do not limit the scope of the disclosure or claims. Also various modifications, combinations, sub-combinations and substitutions are contemplated, depending on desired design characteristics and other factors. Any modifications, equivalent substitutions, and improvements within the realm or spirit of the present disclosure are contemplated to be within the scope of the present disclosure.

Exemplary Clauses

1. A system comprising:
    a compact accelerator system configured to produce multiparticle relativistic bunches of electrons to generate high intensity propagating fields of emitted light; wherein the compact accelerator is independent of any medium or media to remove all constraints on the wavelength of the emitted light; and
at least a portion of a single alternating magnetic field for accelerating the electron bunches to produce light;
wherein a color or wavelength of the emitted light is determined solely by parameters of the bunches of electrons and the alternating magnetic field.

2. The system of clause 1 wherein the electrons are traveling relativistically such that their mass is at least several times their rest mass.
3. The system of clause 1 wherein light produced is 1-1000 watts and wavelength of the light produced is in the range from 3 mm to 30 micrometers.
4. The system of clause 1 wherein the propagating fields from the bunches of electrons are spontaneously induced by a series of magnets of alternating fields.
5. The system of clause 1 wherein the propagating fields from the bunches of electrons are stimulated using an outside propagating field from an external source.
6. The system of clause 1 wherein the propagating fields from the bunches of electrons are stimulated using a propagating field from an electron bunch itself to create a self-amplified spontaneous emission.
7. The system of clause 1 wherein the propagating fields from the bunches of electrons are stimulated using a propagating field circulated inside an optical cavity surrounding the magnets of alternating fields.
8. The system of clause 1 further comprising an imaging system and wherein the propagating fields from the bunches of electrons is intercepted by the imaging system to cause an object to be illuminated.
9. The system of clause 1 wherein the electron bunches are produced by a laser at a gun cathode.
10. The system of clause 1 wherein the electron bunch length is less than 500 fs full width half-maximum.
11. The system of clause 1 wherein electron bunches are 10-1000 pico-Coulombs in charge.
12. The system of clause 1 further comprising a linear accelerator and wherein the linear accelerator operates at frequencies corresponding to S-band or L-band.
13. The system of clause 12 wherein the linear accelerator is pulsed.
14. The system of clause 9 wherein the gun cathode is thermionic.
15. The system of clause 1 further comprising a beam transport system and wherein the beam transport system manipulates an electron bunch length.
16. The system of clause 15 wherein the electron bunch length is manipulated by one or more of an electric field, magnetic field or by use of a dielectric wave guide.
17. The system of clause 1 further comprising an optical system that is used to image an illuminated object to an imaging plane.
18. The system of clause 1 further comprising a detection system configured to measure a reflection, transmission, or absorption of an illuminated object as a function of wavelength.
19. The system of clause 1 wherein the light is utilized to modify the physical, biological, or chemical characteristics of the object.
20. The system of clause 1 further comprising an operating up-time of close to 99%.
21. The system of clause 1 further comprising configuring the system to produce radiation of greater than 5% bandwidth for the purpose of interrogating the reflection, absorption, or transmission of an object.
22. The system of clause 1 further comprising configuring the system to produce radiation of less than 5% bandwidth and wherein the output wavelength is varied by less than or equal to 5% for the purpose of interrogating the reflection, absorption, or transmission of an object.
23. The system of clause 1 further comprising configuring the system to produce radiation for the purpose of measuring the water content of an object.
24. The light source of clause 1 wherein measurements of the emitted light are used to control or modify parameters of the electron bunches by feedback for adjusting or stabilizing the emitted light power, frequency, bandwidth or direction of propagation.
25. An apparatus comprising:
a source yielding a THz field, the source comprising:
an electron bunch generator gun having a cathode for generating relativistic bunches of electrons in the form of an electron beam;
a vacuum transport system for transporting the relativistic bunches of electrons;
a linear accelerator;
a magnet configured for producing a THz field and deflecting spent electrons to a dump and wherein the dump is configured to receive the spent electrons; and
an imaging system coupled to the source, the imaging system comprising:
an objective mirror intercepting the THz field and tailoring the THz field and wherein the objective mirror is configured to cause a body to be illuminated; and
a detector configured to intercept reflected light from the body.
26. The apparatus of clause 25 wherein the source comprises an electron bunching device for further bunching the electrons.
27. The apparatus of clause 25 wherein the source further comprises a pair of cavity mirrors.
28. The apparatus of clause 27 wherein the source further comprises a diverter configured to prevent the electron beam from hitting the mirrors.
29. The apparatus of clause 28 wherein the diverter is one or more dipole magnets.
30. The apparatus of clause 25 wherein the source further comprises an external laser for enhancing bunching of the electrons.
31. The apparatus of clause 25 wherein the source further comprises an alternating magnetic field.
32. The apparatus of clause 25 wherein the imaging system further comprises a window.
33. A method of imaging a body comprising:
providing a THz field with relativistic bunches of electrons in the form of an electron beam;
transporting the for transporting the relativistic bunches of electrons in a vacuum transport system;
accelerating the electron beam in a linear accelerator;
applying a magnetic field to the electron beam to produce a THz field and utilizing the magnetic field to deflect spent electrons to a dump; and
intercepting the THz field with an objective mirror illuminating the body with the objective mirror; and
intercepting the reflected light from the body.

34. The method of clause 33 further comprising further bunching the electrons with an electron bunching device.
35. The method of clause 33 further comprising providing a pair of cavity mirrors.
36. The method of clause 35 further comprising diverting the electron beam to prevent the electron beam from hitting the mirrors.
37. The method of clause 36 diverting the electron beam with one or more dipole magnets.
38. The method of clause 33 further comprising enhancing the bunching of electrons with an external laser.
39. The method of clause 33 further comprising creating an alternating magnetic field and applying the alternating magnetic field to the electron beam.
40. The method of clause 33 further comprising directing the THz field through a window.
41. A method comprising:
    producing multiparticle relativistic bunches of electrons to generate high intensity propagating fields of emitted light;
    removing any medium or media to remove all constraints on the wavelength of the emitted light; and
    providing an alternating magnetic field for accelerating the electron bunches to produce light with one or more magnets;
    altering parameters of the electron bunches and the oscillating magnetic field to change one or more of a color or wavelength of the emitted light.
42. The method of clause 41 wherein the electrons are traveling relativistically such that their mass is at least several times their rest mass.
43. The method of clause 41 wherein the light produced is 1-100 watts and wavelength of the light produced is in the range from 3 mm to 30 micrometers.
44. The method of clause 41 further comprising spontaneously inducing the propagating fields from the bunches of electrons by a series of magnets providing alternating fields.
45. The method of clause 41 further comprising simulating the propagating fields from the bunches of electrons with an outside propagating field from an external source.
46. The method of clause 41 further comprising simulating the propagating fields from the bunches of electrons using a propagating field from an electron bunch itself to create a self-amplified spontaneous emission.
47. The method of clause 44 further comprising simulating the propagating fields from the bunches of electrons using a propagating field circulated inside an optical cavity surrounding the series of magnets providing alternating fields.
48. The method of clause 41 further comprising intercepting the propagating fields from the bunches of electrons with an imaging system to cause an object to be illuminated.
49. The method of clause 41 further comprising producing the bunches of electrons with a laser at a gun cathode.
50. The method of clause 41 wherein the electron bunch length is less than 500 fs full width half-maximum.
51. The method of clause 41 wherein the electron bunches are 10-1000 pico-Coulombs in charge.
52. The method of clause 41 further comprising accelerating the bunces of electrons with a linear accelerator and operating the linear accelerator at frequencies corresponding to S-band or L-band.
53. The method of clause 52 further comprising pulsing the linear accelerator.
54. The method of clause 41 further comprising providing a beam transport system and manipulating an electron bunch length with the beam transport system.
55. The method of clause 54 further comprising manipulating the electron bunch length by one or more of an electric field, magnetic field or by use of a dielectric wave guide.
56. The method of clause 41 further comprising configuring an optical system to image an illuminated object to an imaging plane.
57. The method of clause 41 further comprising measuring a reflection, transmission, or absorption of an illuminated object as a function of wavelength with a detector.
58. The method of clause 41 further comprising modifying the physical, biological, or chemical characteristics of the object with the light.
59. The method of clause 41 wherein the light source produces radiation of greater than 5% bandwidth for the purpose of interrogating the reflection, absorption, or transmission of an object.
60. The method of clause 41 wherein the light source produces radiation of less than 5% bandwidth and wherein the output wavelength is varied by less than or equal to 5% for the purpose of interrogating the reflection, absorption, or transmission of an object.
61. The method of clause 41 further comprising producing radiation for the purpose of measuring the water content of an object.

What is claimed is:
1. A system comprising:
   a compact accelerator system comprising an electron bunch generator gun for generating relativistic bunches of electrons to generate high intensity propagating fields of emitted light;
   a vacuum transport system for transporting the relativistic bunches of electrons;
   a linear accelerator; and
   a series of magnets providing at least a portion of a single alternating magnetic field for accelerating the bunches of electrons to produce the emitted light;
   wherein the compact accelerator is independent of any medium or media to remove all constraints on the wavelength of the emitted light, and wherein a color or wavelength of the emitted light can be adjusted by adjusting one or more parameters of the bunches of electrons and the alternating magnetic field.
2. The system of claim 1 wherein the relativistic bunches of electrons have a mass that is at least several times their rest mass.
3. The system of claim 1 wherein the emitted light produced is 1-1000 watts and wavelength of the emitted light produced is in the range from 3 mm to 30 micrometers.
4. The system of claim 1 further comprising an imaging system and wherein the propagating fields from the bunches of electrons is intercepted by the imaging system to cause an object to be illuminated.
5. The system of claim 1 wherein the bunches of electrons are produced by the electron bunch generator gun and wherein the electron bunch generator gun comprises one of a laser, a gun cathode or a combination thereof.
6. The system of claim 1 wherein an electron bunch length of the bunches of electrons is less than 500 fs full width half-maximum.

7. The system of claim 1 wherein the linear accelerator operates at frequencies corresponding to S-band or L-band and wherein the linear accelerator is pulsed.

8. The system of claim 1 further comprising a beam transport system and wherein the beam transport system manipulates an electron bunch length of the bunches of electrons.

9. The system of claim 8 wherein the electron bunch length is manipulated by one or more of an electric field, magnetic field or by use of a dielectric wave guide.

10. The system of claim 1 further comprising a terahertz imaging system that is used to image an illuminated object to an imaging plane.

11. The system of claim 1 further comprising a detector configured to measure a reflection, transmission, or absorption of an illuminated object as a function of wavelength.

12. The system of claim 1 wherein the emitted light is utilized to modify the physical, biological, or chemical characteristics of an object.

13. The light source of claim 1 wherein measurements of the emitted light are used to control or modify parameters of the electron bunches by feedback for adjusting or stabilizing an emitted light power, frequency, bandwidth or direction of propagation.

14. A method comprising:
   producing multiparticle relativistic bunches of electrons to generate high intensity propagating fields of emitted light;
   removing any medium or media to remove all constraints on the wavelength of the emitted light; and
   providing an alternating magnetic field for accelerating the electron bunches to produce light with one or more magnets;
   altering parameters of the electron bunches and the oscillating magnetic field to change one or more of a color or wavelength of the emitted light.

15. The method of claim 14 further comprising configuring the system to produce radiation of greater than 5% bandwidth for the purpose of interrogating the reflection, absorption, or transmission of an object.

16. The method of claim 14 further comprising configuring the system to produce radiation of less than 5% bandwidth and wherein the output wavelength is varied by less than or equal to 5% for the purpose of interrogating the reflection, absorption, or transmission of an object.

17. The method of claim 14 further comprising configuring the system to produce radiation for the purpose of measuring water content of an object.

18. An apparatus comprising:
   a source yielding a THz field, the source comprising:
      an electron bunch generator gun having a cathode for generating relativistic bunches of electrons in the form of an electron beam;
      a vacuum transport system for transporting the relativistic bunches of electrons;
      a linear accelerator;
      a magnet configured for producing a THz field and deflecting spent electrons to a dump and wherein the dump is configured to receive the spent electrons; and
   an imaging system coupled to the source, the imaging system comprising:
      an objective mirror intercepting the THz field and tailoring the THz field and wherein the objective mirror is configured to cause a body to be illuminated; and
      a detector configured to intercept reflected light from the body.

19. The apparatus of claim 18 wherein the source further comprises a pair of cavity mirrors and one or more dipole magnets providing a diverter configured to prevent the electron beam from hitting the mirrors.

20. The apparatus of claim 18 wherein the source further comprises an external laser for enhancing bunching of the electrons and an alternating magnets producing an alternating magnetic field.

\* \* \* \* \*